(12) United States Patent
Hennecken

(10) Patent No.: US 7,911,730 B2
(45) Date of Patent: Mar. 22, 2011

(54) MAGNETIC HEAD AND TAPE DRIVE FOR READING MULTIPLE DATA FORMATS

(75) Inventor: Mark Hennecken, Denver, CO (US)

(73) Assignee: Oracle America, Inc., Redwood City, CA (US)

( * ) Notice: Subject to any disclaimer, the term of this patent is extended or adjusted under 35 U.S.C. 154(b) by 330 days.

(21) Appl. No.: 12/116,533

(22) Filed: May 7, 2008

(65) Prior Publication Data

US 2009/0279205 A1 Nov. 12, 2009

(51) Int. Cl.
*G11B 5/584* (2006.01)
(52) U.S. Cl. ..................................... 360/77.12
(58) Field of Classification Search ............. 360/110, 360/65, 76, 48, 77.03, 122, 77.12
See application file for complete search history.

(56) References Cited

U.S. PATENT DOCUMENTS

| | | | | |
|---|---|---|---|---|
| 4,533,964 A * | 8/1985 | Owaki et al. | | 360/22 |
| 4,586,093 A * | 4/1986 | Fukuju et al. | | 360/73.02 |
| 5,499,144 A * | 3/1996 | Inoue et al. | | 386/78 |
| 5,515,212 A * | 5/1996 | Chiao et al. | | 360/77.03 |
| 5,535,069 A * | 7/1996 | Chiao et al. | | 360/77.03 |
| 5,715,358 A * | 2/1998 | Ohnaka et al. | | 386/108 |
| 5,739,968 A * | 4/1998 | Inoue et al. | | 360/48 |
| 5,812,162 A * | 9/1998 | Silverbrook | | 347/58 |
| 5,969,912 A * | 10/1999 | Cope | | 360/122 |
| 6,826,020 B2 | 11/2004 | Daby et al. | | |
| 6,937,412 B1 * | 8/2005 | Gill et al. | | 360/48 |
| 7,006,317 B1 | 2/2006 | Hennecken et al. | | |
| 7,436,621 B2 * | 10/2008 | Goker et al. | | 360/76 |
| 7,551,645 B2 * | 6/2009 | Gulati et al. | | 370/474 |
| 2007/0108284 A1 * | 5/2007 | Pankow et al. | | 235/454 |
| 2007/0285838 A1 | 12/2007 | Hennecken et al. | | |

* cited by examiner

*Primary Examiner* — Fred Tzeng
(74) *Attorney, Agent, or Firm* — Brooks Kushman P.C.

(57) ABSTRACT

A magnetic head is provided for reading and writing data on a data storage media. A first writer and a first reader write and read data of a first format. A second reader reads data of a second format having different read channels than the first format. A third reader has a width greater than that of the of the first and second readers, and reads data of a third format wider than that of the first and second formats. A tape drive is disclosed with the magnetic head and control circuitry having read channels for each of the readers. A method for fabricating a magnetic head is disclosed by providing first and second bumps each with a reader and writer of a first format, and a third bump with a reader of a second format and a reader of a third format.

20 Claims, 2 Drawing Sheets

MAGNETIC HEAD AND TAPE DRIVE FOR READING MULTIPLE DATA FORMATS

BACKGROUND

1. Technical Field

Various embodiments of the present invention relate to a magnetic head and a tape drive for reading and writing data to magnetic storage media.

2. Background Art

Storage of data in a secure and retrievable manner has continually developed. Data such as technical, financial, and other information is desired to be stored inexpensively, but also such that it can be retrieved or read months or years after storage such as to allow a company to store data that is not required to be regularly accessible, or to recover from a loss of data caused by a natural disaster or technical failure. To this end, the data storage industry often stores data on disk or optical media for short term data storage; and to magnetic tape or tape cartridges for long term storage or for archiving. It is desirable for the data or information on archived tape cartridges to be accessible or readable for many years. Each company or enterprise may use large numbers of tape cartridges to store data, and as a result, some companies' largest expense associated with data backup and archiving is the storage media itself, and not the tape drives and equipment used to access the tape cartridges.

An ongoing problem in the data storage industry is the development of advances in data storage technology such as tape drive technology, while allowing data storage customers to continue to use their existing libraries of tape cartridges. For example, magnetic read/write heads are used to read data from tape and to write data to tape. There is continued market demand to increase the amount of data that can be written to the same amount of tape, to increase data density on a tape cartridge. One approach to achieve this goal is to reduce the width of the write elements used to write data and more tightly place write elements on the head. The read elements then are also reduced in size to read the narrower tracks of data on the tape surfaces. Unfortunately, these new and narrower read elements often cannot effectively read data written by older or "legacy" heads (or legacy tape drives). A further complication is that code and circuitry that is used to write and to read the data on the tapes, e.g., the recording and read channels, are also changing rapidly. Hence, a new and improved tape drive may include a new read channel that is matched with the drive's recording channel, but this may result in the new tape drive being unable to read data written with a predecessor or legacy tape drive that included a predecessor or legacy recording channel. In other words, each generation of tape drive are utilized differing recording and/or read channels to store data to, and retrieve data from the tape; and these channels often are not wholly compatible.

Compatibility issues between current and predecessor formats may be considered or labeled a lack of backward read capability or legacy read capability, which may be desired to support media reuse. Media reuse protects a user's investments in media and automation infrastructure (e.g., tape library systems and equipment for particular tape cartridges). Reuse is the "reclaiming" of tapes or other media that may have been written by a legacy drive or a more advanced drive; and these reclaimed tapes are rewritten by a different drive that may be advanced, or not, relative to the original drive. Backward reading capability also improves data migration and efficiency and helps reduce the cost of converging media to higher capacity formats of the latest generation tape drives. Unfortunately, backward read capability has proven difficult to provide as customers have tape in their libraries that was written by the prior generation of tape drive and head technology, as well as tape, that was written by drives belonging to much earlier generations (e.g., it is not uncommon for a single customer to have cartridges from four or more generations of tape drives). Testing has indicated that using newer, typically narrower read elements with prewritten tapes provides typically poor to bad results based on detected data error rates, and effectiveness of the newer heads generally decreases over time as wear occurs, such as wear due to pole tip recession. Backward read capabilities of new drives are also reduced in some situations when a read channel is configured for a particular tape surface, e.g., burnished or smoother surfaces versus rough media. Presently, the solutions typically involve maintaining legacy drives for use with legacy tapes (or for recovery operations if the legacy tapes need to be used) and/or by employing a costly and time-consuming migration of data from the legacy tapes to new media, with the legacy tapes being eventually discarded.

SUMMARY

One embodiment provides a magnetic head for reading or writing data on a data storage media. The magnetic head includes a first writer for writing data of a first format. A first reader is provided for reading data of the first format. A second reader is provided for reading data of a second format having different read channels than the first format. A third reader is provided for reading data of a third format, which is wider than that of the first and second formats. The third reader has a width greater than that of the first and second readers.

Another embodiment provides a tape drive for reading and writing data on a data storage media. The tape drive includes a magnetic head with a first writer for writing data of first format, a first reader for reading data of the first format, a second reader for reading data of a second format having different read channels than the first format, and a third reader for reading data of a third format that is wider than that of the first and second formats. The third reader has a width greater than that of the first and second readers. First control circuitry is in communication with the first reader and has read channels for processing signals from the first reader. Second control circuitry is provided in communication with the second reader and has read channels for processing signals from the second reader. Third control circuitry is provided in communication with the third reader and has read channels for processing signals from the third reader.

A method for fabricating a magnetic head for reading multiple formats from a data storage media provides a first bump of the magnetic head with a first reader for reading data of a first format, and a first writer for writing data of the first format. A second bump of the magnetic head is provided with a second reader for reading data of the first format, and a second writer for writing data of the first format. A third bump of the magnetic head is provided with a third reader for reading data of a second format, and a fourth reader for reading data of a third format.

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

The embodiments set forth in the figures are generally illustrative and describe control circuitry, or other such electrically based components. All references to the control circuitry and electrically based components and the functionality provided for each, are not intended to be limited to encompassing only what is illustrated and described herein. While particular labels may be assigned to the control circuitry and/or electrical components disclosed, such labels are not intended to limit the scope of operation for the control circuitry and/or the electrical components. The control circuitry may be combined with each other and/or separated in any manner based on the particular type of electrical architecture that is desired or intended to be implemented in the tape drive system.

Disclosed embodiments are directed to magnetic heads that combine newer technology for read and write elements with legacy read elements to allow a single read head to be used to read tracks from tapes written from multiple formats. To enhance detection or processing of different data signals/values from the different read elements of the same head, tape drives described herein include special-purpose read channels, with sets encoded for processing data from new read elements or from legacy read elements. In this manner, tape drives can provide improved backward read capabilities that increase the ability of tape storage for customers to reuse or continue to use their media and to protect associated past investments.

Figure 1:
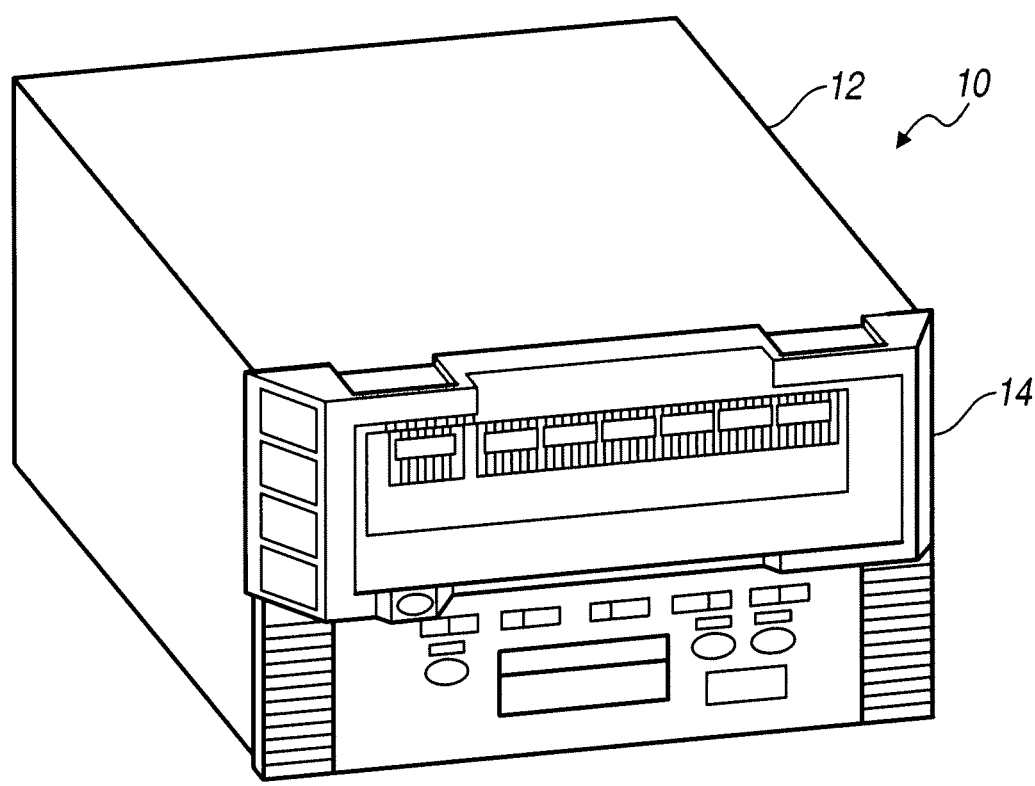
FIG. 1 is a perspective view of a tape drive according to an embodiment of the present invention.

Referring now to FIG. 1, a tape drive is illustrated according to at least one embodiment of the invention and is referenced generally by numeral 10. The tape drive 10 provides backward read capability for reading data from tapes of multiple legacy formats. The tape drive 10 includes a housing 12 that is provided with an opening or door for receiving a magnetic tape cartridge 14 (shown inserted). The magnetic tape cartridge 14 may include legacy tape (i.e., storage media) written by a different tape drive (i.e., a legacy tape drive that is not shown) that utilizes legacy write or record techniques (such as a head with a different write element with and/or different recording channel) that vary from the write or record techniques employed on the tape drive 10.

The physical configuration of the tape drive 10 and its internal drive components and arrangement are not generally limiting of the invention. Briefly, the read/write head concepts and multiple, special purpose read channel concepts may be used in nearly any tape drive that is useful for positioning a magnetic head in a moving tape to read and/or write data; and that includes control circuitry including read and/or write channels for processing and/or formatting data. For example, the tape drive may be of a single reel or dual reel variety. Further description of a physical configuration of the tape drive 10 according to at least one embodiment is disclosed in Hennecken et al. U.S. Patent Application Publication No. 2007/0285838 A1, which published on Dec. 13, 2007 and is incorporated in its entirety by reference herein.

Generally, multi-channel magnetic heads are used in tape drives to read and write information on a magnetic tape while the tape travels in both directions relative to the head. These heads are typically manufactured using well-known thin film processes such as micro-lithography, evaporation, sputtering, ion milling, electroplating, and wet etching to produce magnetic micro-structures on one side of a substrate such as SiC, AlTiC, and ferrite. For example, a number of head architectures use thin film technology to pattern write and read elements on to a substrate, which are then subsequently machined into head bumps and glued together to align the read and write elements for bi-directional tape motion. The particular manufacturing technique is not limiting to the present invention, and the heads of the invention may be manufactured in any manner that provides the described geometry and read/write element arrangement. For example, but not as a limitation, the heads shown on the figures may be fabricated using known or developed piggyback techniques where read or write elements described herein are glued or otherwise attached to other read or write elements provided for reading/writing using "new" technologies and reading legacy data. Alternatively, the heads may be fabricated as merged-pole magnetic heads, and the fabrication may be performed using the processes described in U.S. Pat. No. 6,826,020 B2, which issued on Nov. 30, 2004 to Daby et al., and is incorporated in its entirety by reference herein.

In order to write information onto a tape, read elements are typically located so as to follow the track on the tape being recorded on the write elements. This configuration is known as a read-back check and is used to ensure integrity of information written to the tape. Thus, write and read elements typically operate simultaneously but are spaced apart to control the noise problems with reading or writing. In addition to the spacing requirement, each read element is precisely aligned with the corresponding write element (as shown by a dashed line a-a in FIG. 2) i.e., a "bump-to-bump" alignment. Proper alignment enables the head to be capable of "read-while-write" (RWW) operations to verify that the information has been written to the tape correctly as the tape is conveyed across the head. With these design goals in mind, three bump heads are useful as they provide two outer bumps with read elements and a middle bump with a write element to support RWW operations when the tape is moved in either direction.

Figure 2:
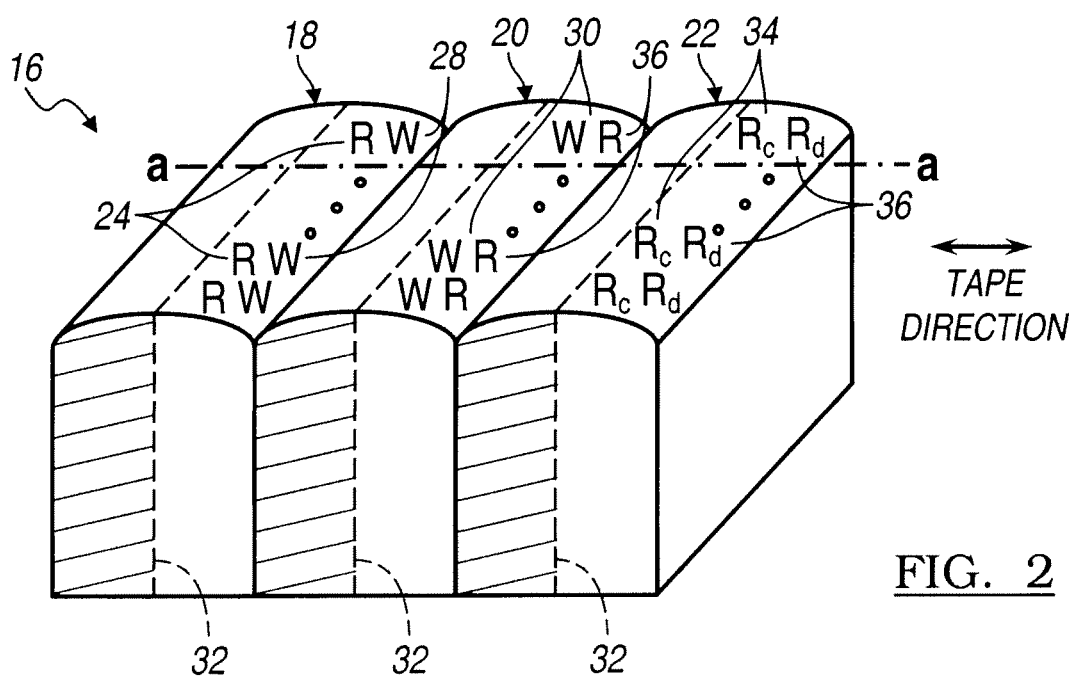
FIG. 2 is a perspective view of a magnetic head according to an embodiment of the present invention illustrating readers and writers schematically.

Referring now to FIG. 2, a magnetic head 16 is illustrated according to at least one embodiment of the invention. The head 16 may be employed by the tape drive 10 for cooperating with data tape of the cartridge 14. The head 16 is designed for RWW operations and include three bumps including first outer bump 18, intermediate bump 20, and second outer bump 22. The head 16 is adapted to support reading and writing using a first technology (such as a new read/write technology developed for a particular tape drive, which may be referred to as an E format) and also to support reading based on multiple technologies that differ from the first (such as legacy technologies).

The first outer bump 18 and the intermediate bump 20 include a number of read elements 24, 26 that are denoted by the symbol "R" in FIG. 2. The first outer bump 18 and the intermediate bump 20 also include a matching number of write elements 28, 30 denoted by the symbol "W" in FIG. 2.

For example, some implementations of the head 16 will include one to sixteen or more read elements 24, 26 and write elements 28, 30 in each bump 18, 20. The new technology read and write elements 24, 26, 28, 30 are aligned as shown by alignment line a-a and gap lines shown at dashed lines 32.

The first outer bump 18 and the intermediate bump 20 permit RWW operations from only two bumps 18, 20 of the head 16. For example, when tape travels in a direction to the right of FIG. 2, write elements 28 perform a write operation while the read elements 26 track the write operation. Likewise, in a reverse tape direction, such as a left direction in FIG. 2, write elements 30 perform a write operation while the read elements 24 track the write operation. During a read only operation, read elements 24 or 26 may be employed for reading from the tape. The read and write elements 24, 26, 28, 30 perform native operations (read/write operations of the first technology) and are depicted on the first outer bump 18 and the intermediate bump 20. However, the invention contemplates that these elements 24, 26, 28, 30 may be provided in any arrangement or configuration upon the bumps 18, 20, 22. By utilizing two sets of write elements 28, 30, the native operation can be isolated to two bumps 18, 20 for retaining the third bump 22 for legacy operations and for optimizing synergies in manufacturing the first two bumps 18, 20.

Although one arrangement of the read and write elements 24, 26, 28, is illustrated for the associated bumps 18, 20, the invention contemplates any arrangement of elements. The depicted arrangement provides generally equivalent spacing of reader 24 and writer 30 in comparison to reader 36 and writer 28.

The head 16 is adapted for reading data from various formats. For example, the head 16 has read back capability for predecessor or legacy formats. In other words, the head 16 is adapted for reading tracks in a tape that were written with a writer other than writers 28, 30. Legacy writers typically include a wider write pole or control circuitry with different read channels. For the embodiment depicted, the head 16 includes a number of legacy readers or read elements 34 for reading a legacy format, hereinafter referred to as format C (depicted by the symbol "$R_c$") on the second outer bump 22. The second outer bump 22 also includes a number of legacy readers or read elements 36 (depicted by the symbol "$R_d$") for reading data from a second legacy format, hereinafter referred to as format D.

The positioning of C format legacy readers 34 and/or D format legacy readers 36 may be aligned with and/or may match the number of the readers 24, 26 and writers 28, 30 of the first two bumps 18, 20. However, the head 16 is configured for reading legacy tapes of multiple formats. Hence, the number and positioning of the legacy readers 34, 36 is selected to match the number and positioning of writers on the associated legacy heads. In some embodiments, the number of legacy readers for each format 34, 36 is sixteen (but a smaller or larger number may be provided). As discussed above, the head 16 may be formed as a merged-pole head or may be formed using piggyback techniques (e.g., fabrication involving stacking together heads and not fabricating in a single step) that are controlled to provide desired positioning alignment of both the first or new technology readers 24, 26 and writers 28, 30 and also the "add-on" legacy readers 34, 36.

The specific design and configuration of the readers 24, 26, 34, 36 and writers 28, 30 is not considered limiting of the invention and nearly any reader or writer (or combination) may be used that is useful for reading and writing data to storage media, such as tape. These elements may include combined thin film magnetic read/write transducers where the read element is a magneto-resistive film or a giant magneto-resistive film. In such an embodiment, the magneto-resistive film and giant magneto-resistive film magnetic read transducers structures typically include a magnetically sensitive film disposed between insulating layers that in turn are flanked by magnetic shields. The process for fabrication of a combined thin film transducer may begin with fabricating the magnetic read transducer and then transitioning into the magnetic write transducer, with it being common for the insulating layer and shield layer above the magnetically sensitive film to double as a base layer in a bottom right pole of the magnetic write transducer.

Figure 3:
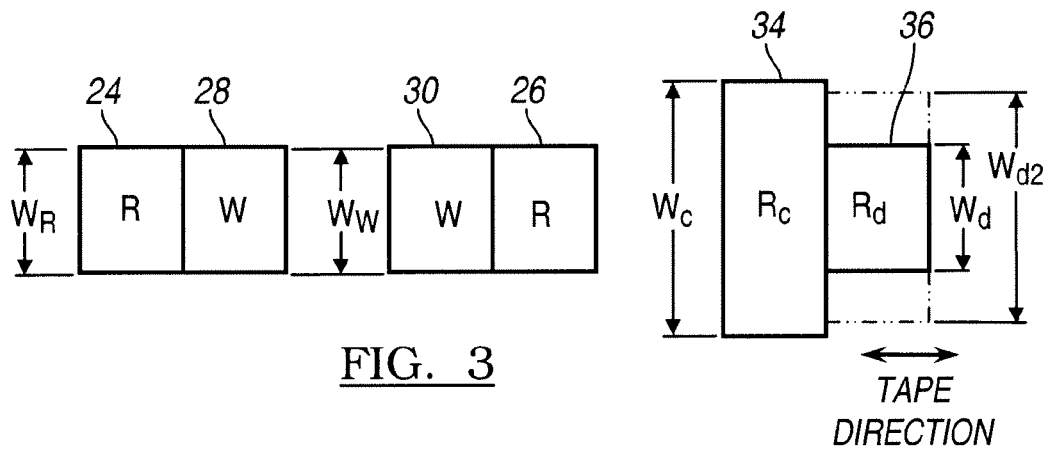
FIG. 3 is a schematic representation of the readers and writers of the head of FIG. 2, illustrating relative widths of the readers and writers.

FIG. 3 illustrates in block form a portion of a magnetic head such as the head 16 of FIG. 2. The illustration of FIG. 3 depicts the size or relative width of the readers 24, 26, 34, 36 and writers 28, 30. The readers 24, 26 for native operation have a first reader width, $W_R$, that is selected for reading data written in tracks of a tape by the writers 28, 30. The writers 28, 30 have a width, $W_W$, and typically, the width of the readers, $W_R$, is based on the width of the writers, $W_W$, and is generally less than this width (e.g., $W_R$ is typically one half of $W_W$ and within an acceptable range and tolerance to facilitate effective or low error rate reading), such as a width less than twenty micrometers, but more typically about six micrometers when the writer width is (or the tracks it rides are) twenty micrometers or less and in some cases, about eighteen micrometers for the newer technology write tracks.

In contrast, the legacy reader 34 for format C has a width, or second reader width $W_c$, that is chosen to support reading of data written by a legacy writer, which typically has a larger width. As a result, the format C legacy writer 34 has a width $W_c$ that is substantially larger than the first reader width $W_R$, (such as reading write tracks greater than eighteen micrometers (i.e., the native operation track width) and with some legacy tracks being twice as larger or, in this case, thirty-six micrometers or larger). The specific C format legacy reader width $W_c$ is selected based upon prior generation legacy writers (e.g., to be about half the width of the legacy writers or the like). In some embodiments, the C format legacy reader 34 is designed based on a single writer element and its width, $W_c$, is selected to correspond to that legacy writer. In other cases, the legacy reader 34 is designed for reading two or more earlier generation writers, and in these cases, the legacy reader 34 may have a width that is larger than some legacy readers but smaller than others to provide effective reading of multiple legacy writer configurations (e.g., with the readers typically being smaller than the writers). The widths may be actual measurements of write pole and read elements/gaps or may be representative of effective read/write widths of the readers 24, 26, 34, 36 and the writers 28, 30.

The D format legacy reader 36 has a width $W_d$ that is chosen to support reading of data written by a legacy writer, which typically would have a width equivalent to that of the width $W_R$ for the readers 24, 26 of the native format. However, if the first technology involves a decreased width relative to the D format, then the width of the D format reader 36 would be greater than the width $W_R$ of the readers 24, 26 of the native format. The greater width of the D format legacy reader 36 is illustrated in phantom as $W_{d2}$.

In at least one embodiment, the D format legacy reader 36 is provided for reading data that is written with a legacy tape drive according to the tape drive disclosed in U.S. Patent Application Publication No. 2007/0285838, which is incorporated by reference herein. The legacy D format tape drive is capable of reading a wider legacy format, which is referenced as legacy format C and which is read by reader 34. Accordingly, the legacy readers 34, 36 provided on the second outer bump 22 are provided for reading all formats that are read by the legacy tape drive of the '838 publication. Accordingly, the first and intermediate bumps 18, 20 are provided with readers 24, 26 and writers 28, 30 for reading and writing a format that is an improvement over formats C and D. The improvement of the native format may be a decreased width and/or improvements in control circuitry such as differing read channels.

In addition to the combined new technology/legacy technology readers, enhanced reading of legacy tapes with a new technology or later version tape drive is facilitated with special-purpose read channels. Briefly, control circuitry is provided that includes legacy read channels in the data processing circuitry for reading data from the legacy readers rather than attempting to utilize read channels that are configured for processing data from the later generation readers, which can result in errors and potential incompatibility.

Figure 4:
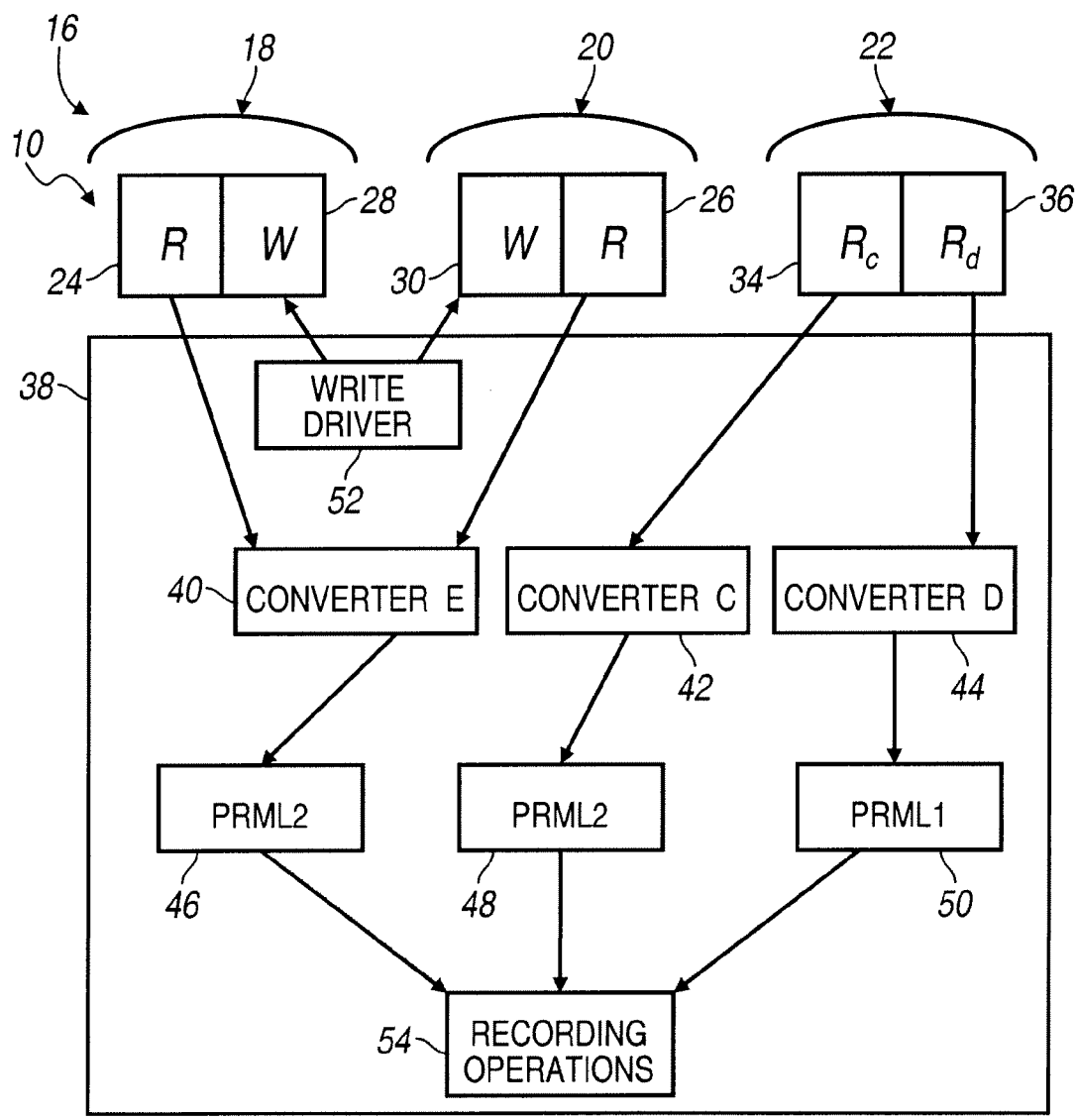
FIG. 4 is a schematic illustration of the head of FIG. 2 and associated tape drive control circuitry.

The tape drive 10 is shown schematically in FIG. 4. The tape drive 10 includes a tape drive control circuitry 38 in communication with the read/write head 16. The head 16 is positioned near or contacting tape of the associated cartridge, such as tape cartridge 14 of FIG. 1. Control circuitry 38 processes user data including writing data and reading data from tape. As shown, analog signals read by the read elements 24, 26 are converted to a series of digital values by analog to a digital converter 40, which is labeled converter E for converting values for the E format. Likewise, analog signals read by the C format reader 34 are converted to digital values by a converter 42 or converter C. Analog signals read by the D format legacy reader 36 are converted to digital values by a converter 44 or converter D.

The control circuitry 38 functions to decode the digital signals provided by converters 40, 42, 44. To provide more effective processing, read channels especially configured or designed for each format of read elements 24, 26, 34, 36 are provided in the control circuitry 38. As shown, read channels 46 are provided for processing digital signals from converter E 40; read channels 48 are provided for processing digital signals from converter C 42; and read channels 50 are provided for processing digital signals from converter D 44. In other words, the control circuitry 38 includes "special-purpose read channels" that are matched to the differing read elements 24, 26, 34, 36 and the data that each of these formats is intended to read from the associated tape. For example, the read channels 46, 48, 50 may be partial response maximum likelihood (PRML) equalization/detection channels and may configured differently such as with legacy read channels including "legacy improvements or differences" that allow to more effectively process the data signals from the legacy read elements 34, 36. In some embodiments, the read channels 46, 48, 50 may be specially configured (e.g., with a unique application specific integrated circuit (ASIC) adapted for particular device or legacy devices) for reading a particular tape format of one or more generations of tape drives.

The control circuitry 38 interfaces with the tape head 16 and includes a write driver 52 for encoding data to be written to tape by the write elements 28, 30.

In at least one embodiment, read channels 50 employ a PRML ASIC referred to as PRML1. PRML1 includes error detection and correction. PRML1 also includes diversity, which is a use of multiple parallel detection channels for each track read from the tape. Each channel is tuned to a different response to accommodate variations in the head tape interface. Read channels 46 and 48 are referred to as PRML2, which may employ a similar PRML ASIC, which does not contain error detection or correction and does not use diversity. PRML1 reduces the signals to noise ratio. PRML2 replaces diversity with an adaptive channel, which results in a reduction of gates over PRML1. In order to read formats E, C and D, readers are required for each of these formats because each format differs in either width or control circuitry. Each of the read channels 46, 48, 50 convey the information to a recording operations ASIC 54.

In one specific implementation, the C format reader 34 and read channels 48 are configured and selected to support reading of tapes or tape cartridges written using T9840A, T9840B, and/or T9840C tape drives; while the D format reader 36 and read channels 50 is configured and selected to support reading of tapes or tape cartridges written using T9840D tape drives; while read and write elements 24, 26, 28, are read channel 46 are configured to support read and write technologies provided with T9840E or later series tape drives being distributed by Sun Microsystems, Inc., and formally by Storage Technology Corporation. Accordingly, the tape drive 10 is configured to read data from tape cartridges of four legacy formats as well as one further developed native format. Additionally, the tape drive 10 permits writing data to the cartridges during a writing operation in the native format. Thus, a user may employ the tape drive 10 for current and legacy tapes.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A magnetic head for reading and writing data on a data storage media, comprising:
    a first writer for writing data of a first format;
    a first reader for reading data of the first format;
    a second reader for reading data of a second format having different read channels than the first format; and
    a third reader for reading data of a third format that is wider than that of the first and second formats, the third reader having a width greater than that of the first and second readers.

2. The magnetic head of claim 1 wherein the first reader further comprises a pair of readers for reading data of the first format, the pair of readers each being oriented on opposed sides of the first writer for tracking the writer during a writing operation.

3. The magnetic head of claim 1 wherein the second reader has a width greater than that of the first reader and less than that of the third reader.

4. The magnetic head of claim 1 wherein the head is provided by three bumps for cooperating with the data storage media, wherein at least one of the three bumps is a merged-pole bump with at least two of the first writer, the first reader, the second reader and the third reader.

5. The magnetic head of claim 4 further comprising a second writer for writing data of the first format, wherein the first writer and the second writer are provided on separate bumps.

6. The magnetic head of claim 5 wherein the first reader further comprises a pair of readers for reading data of the first format, each provided on one of the bumps with the first writer and the second writer for tracking the writer of the other bump during a writing operation.

7. The magnetic head of claim 6 wherein the second reader and the third reader are provided on a common bump.

8. A tape drive for reading and writing data on a data storage media, comprising:
    a magnetic head according to claim 7;

first control circuitry in communication with the pair of first readers, having read channels for processing signals from the pair of first readers;

second control circuitry in communication with the second reader, having read channels for processing signals from the second reader, the second control circuitry being encoded differently than the first control circuitry; and third control circuitry in communication with the third reader, having read channels for processing signals from the third reader, the third control circuitry being encoded similarly to the first control circuitry.

9. The tape drive of claim 8 wherein the second control circuitry further comprises error detection and correction.

10. The tape drive of claim 8 wherein the second control circuitry further comprises multiple parallel detection channels for each track read from the tape.

11. A tape drive for reading and writing data on a data storage media, comprising:
a magnetic head comprising:
a first writer for writing data of a first format,
a first reader for reading data of the first format,
a second reader for reading data of a second format having different read channels than the first format; and
a third reader for reading data of a third format that is wider than that of the first and second formats, the third reader having a width greater than that of the first and second readers;
first control circuitry in communication with the first reader, having read channels for processing signals from the first reader;
second control circuitry in communication with the second reader, having read channels for processing signals from the second reader; and
third control circuitry in communication with the third reader, having read channels for processing signals from the third reader.

12. The tape drive of claim 11 wherein the first control circuitry and the second control circuitry are encoded differently.

13. The tape drive of claim 11 wherein the second control circuitry and the third control circuitry are encoded differently.

14. The tape drive of claim 11 wherein the first control circuitry and the third control circuitry are encoded similarly.

15. The tape drive of claim 11 wherein the second control circuitry further comprises error detection and correction.

16. The tape drive of claim 11 wherein the second control circuitry further comprises multiple parallel detection channels for each track read from the tape.

17. A tape drive system for reading and writing data on data storage media cartridges comprising:
a tape drive according to claim 11;
a plurality of tape cartridges of the first format;
a plurality of tape cartridges of the second format; and
a plurality of tape cartridges of the third format.

18. A method for fabricating a magnetic head for reading multiple formats from a data storage media comprising:
providing a first bump of the magnetic head with a first reader for reading data of a first format, and a first writer for writing data of the first format;
providing a second bump of the magnetic head with a second reader for reading data of the first format, and a second writer for writing data of the first format; and
providing a third bump of the magnetic head with a third reader for reading data of a second format, the third reader having a width greater than that of the first and second readers, and a fourth reader for reading data of a third format.

19. A method for reading data on a data storage media cartridge comprising:
providing a tape drive;
providing a magnetic head fabricated according to claim 18, in the tape drive;
providing first control circuitry in communication with the first and second readers, having read channels for processing signals from the first and second readers;
providing second control circuitry in communication with the third reader, having read channels for processing signals from the third reader;
providing third control circuitry in communication with the fourth reader, having read channels for processing signals from the fourth reader;
loading a cartridge with data storage tape of one of the first, second and third formats, into the tape drive;
conveying the tape of the cartridge along the magnetic head; and
reading data on the tape from the associated reader.

20. The method of claim 19 further comprising writing data on the tape of the first format if a writing operation is requested.

* * * * *